United States Patent Office.

HENRY A. CHASE, OF TULLY, NEW YORK.

Letters Patent No. 105,425, dated July 19, 1870.

IMPROVED MEDICAL COMPOUND FOR TREATING RHEUMATISM, &c.

The Schedule referred to in these Letters Patent and making part of the same

To all whom it may concern:

Be it known that I, HENRY A. CHASE, of Tully, in the county of Onondaga and State of New York, have invented a new and improved Rheumatic Compound; and I do hereby declare that the following is a full, clear, and exact description thereof, which will enable others to make and use the same.

The following is a list of the ingredients and their relative proportions:

One quart of alcohol.
Two ounces of gum-camphor.
Two ounces of oil-peppermint.
One ounce of spirits ammonia.
One ounce of oil-hemlock.

The resultant mixture is applied locally, as a lotion. If the system is somewhat debilitated, I make a copious application with a sponge, by beginning on the back and following down the spine, and then working off onto the shoulders and arms, and also onto the hips and legs, the mixture being applied so freely as to run off. In this manner one application is sufficient, usually, to relieve an ordinary case.

It is found to be a good remedy, also, for asthma, and has been used for diphtheria with good results. For such complaints twelve or fifteen drops of the mixture are added to some sugar, and the sugar held in the mouth and swallowed as it dissolves.

Having thus described my invention,

What I claim as new and desire to secure by Letters Patent, is—

A medicinal compound composed of the within ingredients, in about the proportions mentioned, for the purpose described.

The above specification of my invention signed by me this 10th day of December, 1869.

H. A. CHASE.

Witnesses:
C. E. WARNER,
F. A. MORLEY.